US008495488B2

(12) United States Patent
Colbran

(10) Patent No.: US 8,495,488 B2
(45) Date of Patent: Jul. 23, 2013

(54) TOOL FOR INTERACTING WITH AND COMPARING SCORES IN MARKED DOCUMENTS

(75) Inventor: Stephen Colbran, Bulimba (AU)

(73) Assignee: RemarksPDF Pty Limited, Bulimba, Queensland (AU)

( * ) Notice: Subject to any disclaimer, the term of this patent is extended or adjusted under 35 U.S.C. 154(b) by 119 days.

(21) Appl. No.: 12/674,107

(22) PCT Filed: Aug. 21, 2008

(86) PCT No.: PCT/AU2008/001173
§ 371 (c)(1),
(2), (4) Date: Apr. 16, 2010

(87) PCT Pub. No.: WO2009/023896
PCT Pub. Date: Feb. 26, 2009

(65) Prior Publication Data
US 2010/0313114 A1    Dec. 9, 2010

(30) Foreign Application Priority Data

Aug. 21, 2007 (AU) ................. 2007904494
Apr. 1, 2008 (AU) ................. 2008901544

(51) Int. Cl.
*G06F 17/00* (2006.01)

(52) U.S. Cl.
USPC ............................ 715/230; 715/751; 715/215

(58) Field of Classification Search
None
See application file for complete search history.

(56) References Cited

U.S. PATENT DOCUMENTS

| 4,674,043 | A | * | 6/1987 | Hernandez et al. ........... 715/209 |
| 6,652,287 | B1 | | 11/2003 | Strub et al. |
| 6,721,921 | B1 | | 4/2004 | Altman |
| 6,918,083 | B2 | | 7/2005 | Smith |
| 2006/0257841 | A1 | | 11/2006 | Mangano |

FOREIGN PATENT DOCUMENTS

| WO | 2004/072794 | 8/2004 |
| WO | 2007/062450 | 6/2007 |
| WO | 2009/023896 | 2/2009 |

OTHER PUBLICATIONS

"Turnitin Instructor User Guide"; Sep. 26, 2006; iParadigms, LLC; pp. 1-75.*
International Search Report and Written Opinion from PCT/AU08/001173 dated Sep. 26, 2008.

* cited by examiner

*Primary Examiner* — Stephen Hong
*Assistant Examiner* — Asher Kells
(74) *Attorney, Agent, or Firm* — Calfee, Halter & Griswold LLP

(57) ABSTRACT

This invention concerns a document markup tool, that is an application where existing authored documents can be marked or annotated. For instance, formative or summative assessment submissions authored by students might be graded by a teacher using the markup tool. The tool itself is operable by a user at a computer user interface to: Recognize the members of a set of existing documents. Open one of the existing documents in a set and display its contents to a user together with a toolbar. And, select locations in the document and, using the toolbar, add commentary and scores to the document. Wherein the markup tool is automatically operable to: Total the scores made in a document. Display the scores in a graphical report in the document. Display a moderation panel which enables visual and statistical comparisons of the scores made in a document to the scores added to all the documents of the set. And, reflect changes to the scores made in a document in the displayed moderation panel.

20 Claims, 11 Drawing Sheets

| ReMarks/Assessment/LS000 | | | | | |
|---|---|---|---|---|---|
| About | Help | Logout | Tech Support | Feedback ||||||
| This screen enables you to setup and view assessment in a unit. To delete an assessment, select the row and press delete on your keyboard, drag the row into the rubbish bin, or press [ - ] at the end of a row. Click [ X ] to close this panel. ||||||
| Assessment No | Title | Due Date | Actions | Status | |
| 1 | Assignment | 26/03/06 | None | 56 of 124 (69%) marked | [-] |
| 2 | Multichoice | 30/04/06 | None<br>Setup Assessment<br>Assessment Scheduling<br>Allocate Marking<br>Commence Marking<br>Setup Evaluations | Marking not started | [-] |
| 3 | Final Exam | 1/06/06 | | Marking not started | [-] |
| [+] Add Assessment ||||||

OK    Cancel    Reports

FIG. 2(a)

| ReMarks/Marking/Allocation/LS000 Assignment 1 | | | | | | | | | |
|---|---|---|---|---|---|---|---|---|---|
| About | Help | Logout | Tech Support | Feedback |||||||||
| This screen enables you to allocate marking in a unit. To delete a marker, select the row and press delete on your keyboard or drag the row into the rubbish bin. Click [ X ] to close this panel. |||||||||||
| Marker | Q1 | Q2 | Q3 | Q4 | Allocated | 2nd date | Q1 | Q2 | Q3 | Q4 |
| Joe Bloggs (A) | 55 | 0 | 0 | 0 | 15/06/06 | 29/06/06 | 0 | 5 | 0 | 0 |
| Sally Bloggs (B) | 0 | 24 | 0 | 0 | 15/06/06 | 29/06/06 | 10 | 0 | 0 | 0 |
| Jim Carey (C) | 0 | 0 | 45 | 0 | 15/06/06 | 29/06/06 | 0 | 4 | 0 | 0 |
| Totals | 55 | 24 | 45 | 0 | | | 10 | 9 | 0 | 0 |
| [+] Add Marker | Student Allocation Method [Random] ||||||||||

OK    Cancel    View individual student allocation    Reports

Individual Student Allocation – Assignment 1

| Student Name | Student No | Markers | | | | Allocated | 2nd marking | 2nd marking | | | |
|---|---|---|---|---|---|---|---|---|---|---|---|
| | | Q1 | Q2 | Q3 | Q4 | | | Q1 | Q2 | Q3 | Q4 |
| Sally Peters | 1245789 | A | B | C | | 15/06/06 | 29/06/06 | | A | | |
| Sam Leg | 7543647 | A | B | C | | 15/06/06 | 29/06/06 | B | | | |
| Jim Liver | 3456792 | | B | C | | 15/06/06 | 29/06/06 | | C | | |
| Totals | | 55 | 24 | 45 | | | | 0 | 4 | 0 | 0 |

OK    Cancel    View marking allocation    Reports

FIG. 2(b)

| | Edit Marking Criteria | | | | |
|---|---|---|---|---|---|
| Edit Marking Criteria | | | | | |
| Unit Title LS 100 | Assessment No. 1 | Question No. 1 | | Marks | |
| 1. Criteria 1 | | | | | ▼▲− |
| 2. Criteria 2 | | | | | ▼▲− |
| 3. Criteria 3 | | | | | ▼▲− |
| + Add New Criteria | | | Total Marks | | |
| | OK Cancel | | | | |

FIG. 4(d)

Mark Comment     25/04/2007 14:48:56
scolbran     Options

120 — Mark: +1
      Criteria: 1. Criteria 1    122
124 — Comment:
      You would have received an extra mark if you
      had mentioned ..

FIG. 4(e)

| Marking Tally | |
|---|---|
| Unit Title LS 100    Assessment No. 1    Question No. 1 | |
| Criteria | Marks |
| Criteria 1 | 11 |
| Criteria 2 | 23 |
| Criteria 3 | 2 |
| Criteria 4 | 3 |
| Total raw mark | 39 |
| Moderation | -1 |
| Lateness penalty | -1 |
| Final mark | 37 |

OK    Cancel

FIG. 4(f)

Proposed Marking Tool Examples

INTRODUCTION

Congratulations on y[...] [100] [...]r Legal Studies 2007, the previous se[...] This requires more [...]e Australian Legal System, Wron[...] research. [...]mily, Technology, and Renting and Buying a Dwelling for Queensland secondary schools.

[102] The CD-ROM contains seven/mul[... [102] Sticky Note 26/04/07 4:39:35
resources sites. Each p[r]ogra[... stephencolbran    Options
[...] basic rules of law and apply th[... This is an example of a sticky
situations. Legal Words Pty Ltd al[...] note
"Web resources" at http://users.tp[...]

Each program is based upon the secondary school legal [106]
studies course and materials and is pitched at the appropriate
[108] level. Each program does, however, include some more
difficult questions to challenge those students who have
mastered the basics.           [110]        [104]

Unit 1: The Australian Legal System is a multimedia program designed to assist legal studies teachers and students in understanding the Australian Legal System. Topics covered [114]
include: Why have laws, legal literacy skills, what are the
sources of law, parliament, how disputes are resolved, review of decisions, legal personnel, how developments and changes
in law reflect social change, and contemporary legal issues. [116]
        [112]

FIG. 5

| | Manage Grading Scale | | |
|---|---|---|---|
| Manage Grading Scale | | | |
| Unit Title | Assessment No. | Question No. | |
| ▸ LS 100 | 1 | 1 | ▼ ▲ — |
| LS 200 | 1 | 1 | ▼ ▲ — |
| LS 300 | 1 | 1 | ▼ ▲ — |
| Set active | Reset | Cancel | Edit | Import | Export | OK |

FIG. 6(d)

| | Edit Grading Scale | |
|---|---|---|
| Edit Grading Scale | | |
| Unit Title  LS 100 | Assessment No.  1 | |
| Grade | Marking Range % | |
| N | 0 | 49 | ▼ ▲ — |
| P | 50 | 64 | ▼ ▲ — |
| C | 65 | 74 | ▼ ▲ — |
| D | 75 | 84 | ▼ ▲ — |
| HD | 85 | 100 | ▼ ▲ — |
| [+] Add Grade | | |
| OK | Cancel | Save as default |

Citate  Options

Sensitivity: Low [ ▼ ] High

- ☑ Ignore quotes
- ☑ Ignore images
- ☑ Display data matches
- ☑ Generate data-matching index
- ☑ Generate plagiarism allegation report
- ☑ View list of data-match indices above [x]%
- ☑ View list top [n] of data matches

| SEARCH | CITATION CLASSIFICATION |
|---|---|
| ☑ ReMarks database | [Create] [Manage] [Edit] |
| ☑ Internet | ☑ Default |

Student Name/No (Matching Index) [ Cooper, Sally ▼ ]

| Cooper, Sally | 80% |
| Dork, Edwin | 75% |
| Imnogoo Dyan | 65% |

Distribution [ All my students ▼ ]
Sort [ Alphabetic ▼ ]

301

Data-matching Index

[ View Student Record ] [ Generate Plagiarism Allegation ]

FIG. 7

TOOL FOR INTERACTING WITH AND COMPARING SCORES IN MARKED DOCUMENTS

The present application is the U.S. national phase entry of PCT/AU2008/001173, filed 13 Aug. 2008 which claims priority from Australian Provisional Patent Application Serial No. 2007904494 filed on 21 Aug. 2007, and Australian Provisional Patent Application Serial No. 2008901544 filed on 1 Apr. 2008, the contents each of which are incorporated herein by reference.

TECHNICAL FIELD

This invention concerns a document markup tool, that is an application where existing authored documents can be marked or annotated. For instance, formative or summative assessment submissions authored by students might be graded by a teacher using the markup tool, or an employment application might be assessed by an employer against set criteria, or a grant application might be assessed by several grant agency assessors against predetermined criteria.

DISCLOSURE OF THE INVENTION

The invention is a document markup tool for annotating existing authored documents, operable by a user at a computer user interface to:
  Recognize the members of a set of existing documents.
  Open one of the existing documents in a set and display its contents to a user together with a toolbar. And,
  Select locations in the document and, using the toolbar, add commentary and scores to the document.
  Wherein the markup tool is automatically operable to:
    Total the scores made in a document.
    Display the scores in a graphical report in the document.
    Display a moderation panel which enables visual and statistical comparisons of the scores made in a document to the scores added to all the documents of the set. And,
    Reflect changes to the scores made in a document in the displayed moderation panel.

The markup tool may be further operable to display an allocation panel which enables existing documents, in part or in whole, to be allocated to a set that can be displayed to a user. For example, a unit coordinator may allocate one or more documents, and one or more sections of the documents, to one or more markers or to several markers.

A precursor step may involve document translation into a document type able to be handled by the tool. The document type may be one of Portable Document Format (PDF), Extensible Markup Language (XML), Open XML, Open Document Format, HTML, XHTML and other suitable markup formats.

The markup tool may take the form of a plug-in for, or amended coding within, a document handling application. The document handling application may be a PDF editor, such as Adobe Acrobat Professional, or a PDF Reader such as Adobe Reader. The document handling application may also be a Microsoft Office application such as Word, Excel or Visio that is able to handle XML markups. The document handling application may also be an Open Office application such as, Writer, Impress or Math, that is able to handle markups.

Alternatively, the tool could take the form of additional features added to a document handling application. Alternatively again, the tool could be a new document handling application itself. In another form, the tool could be a web-based or SMS-based application and may be supported by any type of communications network.

The tool may be set up to recognize all documents submitted for a particular assessment as a set. The assessment may be for an academic assignment, job application, grant application or any purpose that requires assessment against predetermined criteria.

Scores displayed may also be broken down by assessment or marking criteria.

Further, the markup tool may include functionality to embed within the document one or more of
  Video and audio commentary, including auto-video and auto-audio commentary;
  Comments, auto-text comment sheets and electronic sticky notes;
  Underlining, strikeout, colour-coded highlighted text and background;
  Stamps, including images, emoticons and animations;
  Drag and drop self-populating graphs and reports;
  Mark tally's;
  Colour keys indicating meanings attached to colours;
  Auto-colour coding of data-matches; and
  Attachments such as electronic files, video or audio commentary.

The moderation panel may have an associated database, content management system, or business intelligence system to store the marks and documents, and all may operate to automatically update as grading or moderation occurs. The moderation panel may enable easy identification and opening of documents based on one or more of the following:
  Marking criteria;
  Number of marked papers;
  All marked papers by a particular marker;
  All marked papers by all markers combined;
  Grading scale breakdown;
  Document submitter's name or other identifier;
  Document submitter's demographic characteristics, such as age, gender, ethnicity and location;
  Document submitter's status, such as full-time, part-time, internal or external and domestic or international;
  Standard deviations above or below the mean; and
  Mean, median and mode of the scores.

The moderation panel may display marked papers by a particular, or all, markers in alphabetical order, in order of marking and in order of grade. The moderation panel may also display any other information associated with the document or document submitter.

The moderation panel may enable marks to be allotted directly on standard normal distribution, or on bars of the underlying histogram created by displaying a continually updated marking histogram. All students' marks associated with a bar on the histogram can be changed by dragging the bar to a new location on the histogram. The changed marks are then automatically updated in the moderation panel, marks tally, including in individual student marked up assessment, and the associated databases.

The moderation panel may serve as a summary tool if there is no moderation and submissions are returned as soon as they are individually marked. There are no changes to marking in this scenario, unless the submitter appeals the marks and such an appeal is allowed.

If a submission is moderated, the moderation panel may allow identification and access to individual submissions and enable changes to marks in light of the submission. The changed marks are then automatically reflected in the moderation panel, marks tally, and associated database. Identification and access may be achieved by either clicking on the submitter identifier dropdown box or clicking on the bars of the histogram.

Further, the markup tool may also display a data-matching panel which matches contents of an existing document with other documents in a database or on the Internet. This tool is useful for the detection of potential plagiarism and copyright infringement.

Further, the markup tool may display both a match in a document submission and the match from a database or the Internet, whichever has the higher text-match index.

For each match in a document submission, a drop-down box enables classification of plagiarism. For each corresponding match with a document obtained from an external database or the Internet, the user may get a listing of a predetermined number of lower level matches. Each of these lower level matches may be selected to display to the user for comparison.

The data-matching panel may enable calculation of a data matching index that indicates the percentage match of the words in the existing document compared with other documents.

The data-matching panel may also enable generation of a plagiarism allegation report based on either the data-matching index or classification of plagiarism. The report may list one or more allegations of unattributed quotation, sham paraphrasing, metaphor plagiarism, valid citation, idea plagiarism, reasoning style, inappropriate citation, copyright abuse and organisational plagiarism. Other classifications of plagiarism may be used.

The database stores marked up documents in PDF, XML, Open XML, Open Document Format, HTML or XHTML; and other relevant information such as marks, identity of document submitters and users who have access to the documents. The database may also be linked to an external database, such as a database of an external content management system, or business intelligence system. The moderation tool, when in use, requires connection with the database.

A stamp library may also be provided enabling the search, selection, and visual display of stamps for insertion into the student document.

A sound library may also be provided enabling the visual display of the titles of recorded sounds, recording of sound, creation of sound comment sheets, search, selection and insertion of sounds into the student document.

A video/animation library may also be provided enabling the visual display of the titles of recorded video/animation, recording of video/animation, creation of video/animation comment sheets, as well as search, selection and insertion of video/animation into the student document.

A reporting tool may also be provided enabling the visual display of individual results and comparative results. Visual displays can be selected, automatically populated with data from the database, content management system, or business intelligence system and inserted into the student document.

BRIEF DESCRIPTION OF THE DRAWINGS

Examples of the invention, in the context of grading student scripts, will now be described with reference to the accompanying drawings, in which:

FIG. 2(a) is a screenshot showing the Assessment Window. FIG. 2(b) is an interface for allocating submissions to markers.

FIG. 4(d) is the interface for editing marking criteria. FIG. 4(e) is a screenshot of the mark comment markup. FIG. 4(f) is a screenshot of a marking tally.

FIG. 5 is an example of a marked assessment submission.

FIG. 6(d) is the interface for managing grading scales. FIG. 6(e) is the interface for editing a grading scale.

FIG. 7 is a screenshot showing the plagiarism detection or citate tab menu.

BEST MODES OF THE INVENTION

The document markup editor/reader of this invention could form part of a more comprehensive educational system, such as that described in the applicant's co-pending International patent application PCT/AU2006/001593 [WO 2007/062450 A1] entitled "Assessment of Educational Services".

Figure 1:
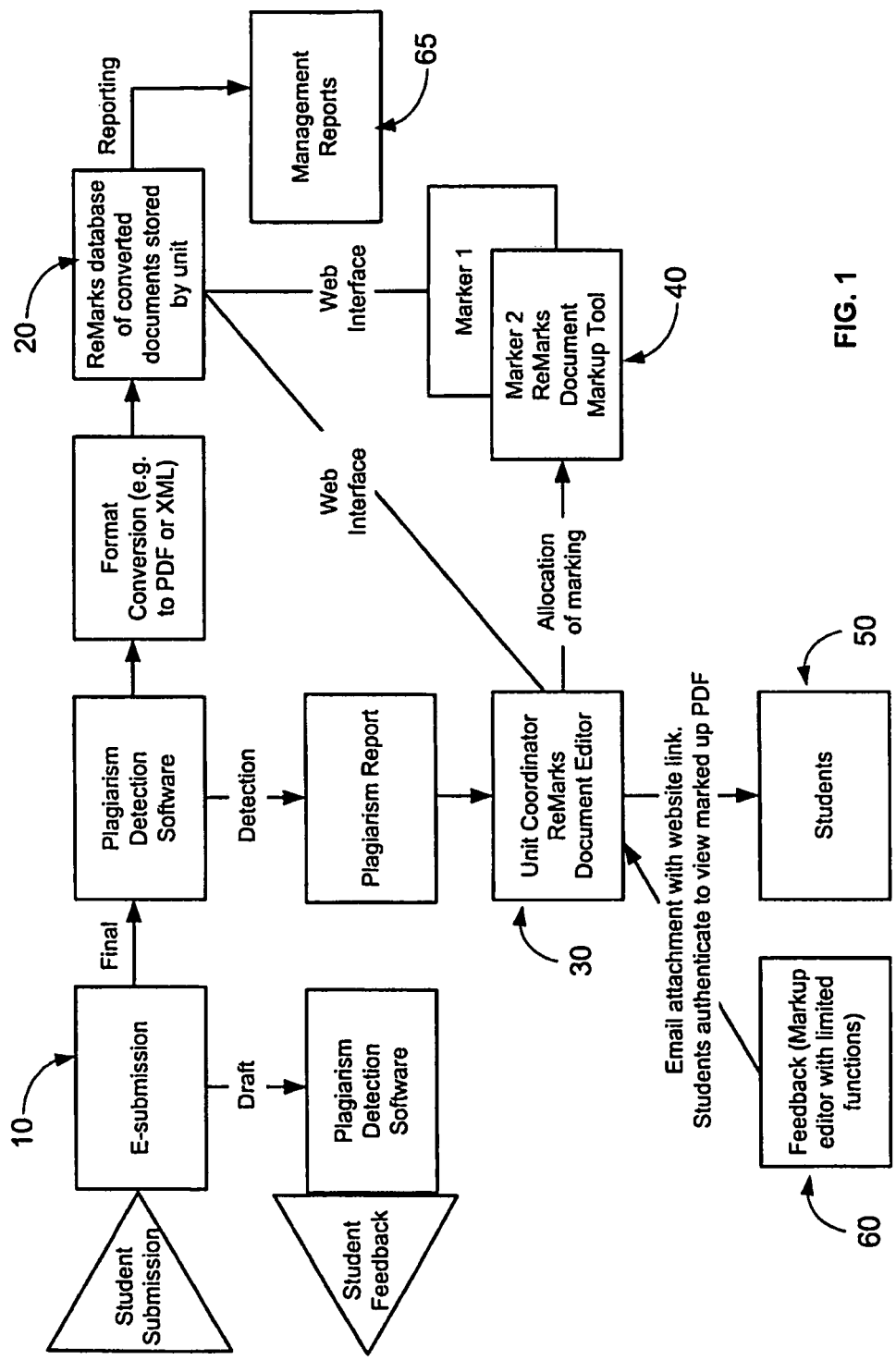
FIG. 1 is a block diagram of an enterprise e-submission solution including the invention.

In the context of such a system the invention is illustrated as part of the exemplary enterprise solution shown in FIG. 1, which involves six processes:

E-submission of assessment submissions in PDF, XML, Open XML, Open Document Format, HTML, XHTML or similar format, with or without plagiarism detection 10.

Submission conversion into PDF, XML, Open XML, Open Document Format, HTML, XHTML or similar format, depending on the document markup tool used 20. The converted documents are stored in a database or content management system 20, the ReMarks database of FIG. 1, having at least the following fields:

|  |  |  |  |  | Assessment 1 Question 1 | | |
|---|---|---|---|---|---|---|---|
| Student cohort identifier | Student name | Student number | Originally submitted Document | Marked-up Document | Criteria 1 mark | Criteria 2 mark | Total mark |

Assessment allocation by unit coordinators using the ReMarks web interface 30.

Assessment marking and moderation using the ReMarks document markup editor/reader 40.

Return of marked up assessment to students via email attachment or made available on a Learning Management System (LMS) website, student portal, SMS, or other electronic communications system 50. The marked up assessments maybe regenerated to update inserted reports, mark tallies and as a secure PDF or other secured markup file to embed the markup before they are returned to students.

Feedback from students on the marked up assessment 60. The feedback from students can also be stored in the Remarks database or content management system for future reference.

Management report generation to assess student performance.

Assessment Allocation

Referring now to FIG. 2(a), an "Allocate" icon opens the assessment window see FIG. 2(a) which allows:

unit coordinators to specify and setup assessment in a subject, to allocate marking among markers and to identify markers for a particular student and markers to identify papers allocated to them and commence marking from the list of allocated papers.

Selecting "Setup Assessment" in FIG. 2(a) opens a form which details the nature of the assessment item in a subject. Selecting "Allocate marking" in FIG. 2(a) opens the form shown in FIG. 2(b) which allows for allocation of assessment papers. Assessment can be allocated electronically on several basis including, but not limited to: randomly, student number, student name and marker identified. If the marking is allocated electronically, markers will have a list of assessment to mark, will be able to access each assessment on the list, and be able to mark each assessment. If the marker identified option is selected markers are presented with a list of all students. Markers using the system interface identify which assessment submissions they have received from which students. Assessment submissions may have been received electronically or in hard-copy.

The set of assessment papers allocated to a marker will be displayed on the interface when the marker logs on to the system. The marking cells are shaded and inactive if the question has not been allocated to that marker. A "Show all" radio button shows all allocated students available for marking by this marker. A "Hide marked" radio button hides the rows that have been marked. A "Show marked" radio button shows all marked rows.

When a document icon under the "Assessment" column is clicked, the document will be opened with the appropriate document handling application, such as Microsoft Word, Open Office, ReMarksPDF, and Adobe Reader, with the document markup tool.

Assessment Marking Using an XML Markup Tool for Microsoft Word (Open XML Format) or Open Office (Open Document Format)

The markup tool can also be incorporated in Microsoft Word or Open Office as a ribbon or a palette, or both.

An "Annotate" menu for the markup tool includes the following categories: Comment tools, Format tools, Media tools, Grading tools and Management tools.

Comment tools include "New Comment" to insert a new comment; "Auto-text" to insert an auto-text; "Pen" to select pen features such as type and size of pen; "Highlighter" to highlight a selected portion of the document, for example, to add a default or user-specified meaning; "Text Box" to draw a text box on the document; and "Eraser" to remove user specified markups on the document.

Meanings can be assigned to various colours. A "Highlighter" tool allows the options of highlighting a section or area of the document as well as creating, importing, exporting, editing, inserting a colour key. For example, user defined meanings such as "essential", "important", "useful", "background", "irrelevant" and "incorrect" can be assigned to a range of colours generally or for a particular assessment. The meaning can be set by enterprise policy or individual choice.

Format tools include "Colour" and "Weight" to select a colour and line weight, respectively.

Media tools include "Clip Art" to insert a stamp, "Sound" to record and embed a voice clip, "Video" to record and embed a video/animation and "Attach File" to attach a file to the document. Files that can be attached include prepared audio and video/animation clips, flash files, database files and other electronic file types.

Figure 4A:
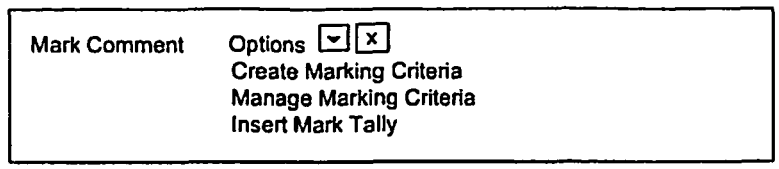
FIG. 4(a) is the options available for the mark tool.
Figure 4B:
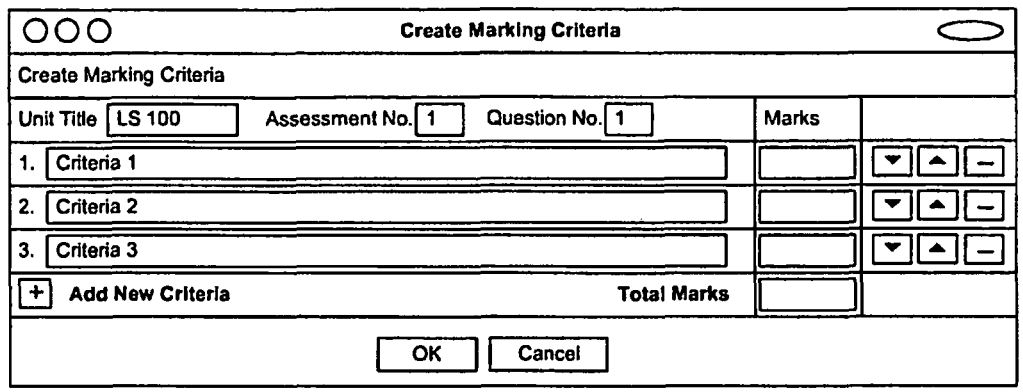
FIG. 4(b) is an interface for creating marking criteria.
Figure 4C:
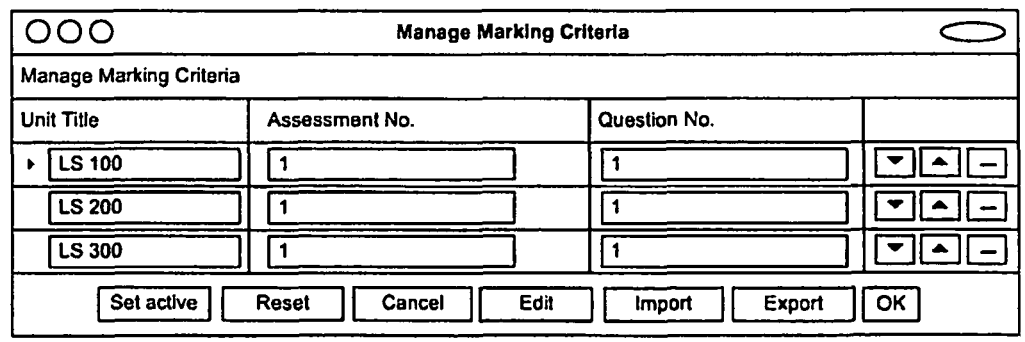
FIG. 4(c) is the interface for managing marking criteria.

Grading tools include "Allocate" to allocate marking and "Mark" to enter marks, grades and comments. The options for mark comment, see FIG. 4(a) include: create marking criteria, see FIG. 4(b); manage marking criteria, see FIG. 4(c); edit marking criteria, see FIG. 4(d); and a marking tally, see FIG. 4(f).

The marks may be automatically tallied. A total of all marks will be inserted into the document and broken down by criteria; see FIG. 4(f). The marking tally will also display any moderation, bonus marks and lateness penalties. For example, if in the moderation tab menu, a histogram bar is dragged by the user down by one mark, all students represented by that histogram bar will lose one mark. This will be shown in their individual mark tally (Moderation-1) and is reflected in the updated moderation panel and database. A "Text Comment sheet" is used for importing or exporting user defined standard comment. Finally, "Reports" allows a summary graph or several summary graphs or tables of student performance to be inserted into the document.

Management tools include "Cover Page" to insert a cover page to the assessment paper; "Page colour" to alter page background, for example to increase visibility of comments; "Print" to print the document; "Mail" to email the marked document to a student, and "Markup on/off" to display or hide the markup.

FIG. 5 shows a student's assessment submission that has been marked using the invention, and a number of features will be described. A comment 100 provides feedback to a student. A sticky note or mark comment 102 inserted using the "Mark" tool provides an alternative. A video embedded recording 104 allows detailed explanations to be provided. An suitable video format such as MPEG, WMV, RMVB and DivX may be used.

An audio embedded recording 110 in MP3 or other suitable format may also be used for this purpose. Underlining 106 and strikeout 108 are traditional ways of giving feedback. Highlighting 114 is also provided. Attachments are indicated by the paperclip icon 112. A library of emoticon icons 116 can also be used, for example by applying clipart tool. The markups may be stored in various formats including XML, Open XML, HTML, XHTML or similar format.

Assessment Marking Using an Adobe Reader 8 Markup Tool

In another example, the document markup tool can be incorporated in Adobe Reader 8 or later or Adobe Acrobat Professional 8 or later application or similar product. The document markup tool will include the tools described in the previous section with reference to Microsoft Word and Open Office, including the following enhancements:

The ability to enter marks to a student assessment submission, whether linked to assessment marking criteria or otherwise. Marks are automatically totaled and summarized.

A moderation panel indicating the spread of student marks and grades for a particular assessment, and also allowing the review of identified student groups. Student groups can be based on marks awarded for criteria, number of students in the order marked, and student grades. Once selected a student's marked PDF will open for moderation. The moderation panel will update on-the-fly.

A colour key markup system enabling the definition of meanings to set colours used in highlighting, underlining and strikethrough modes.

Definition and use of a text commentary sheet, sound comment sheet, and video/animation comment sheet for commonly occurring errors.

A system for handling large numbers of stamps for marking purposes, including the use of animated gifts conveying emotions, commonly called emoticons.

A sound commentary.

A video/animation commentary.

A reporting system building individual and comparative descriptors.

Storage of the marks, grades and associated markup in the ReMarks database.

The invention allows teachers at secondary and tertiary levels to use Acrobat Reader or Acrobat Professional as a more effective marking tool. The design assumes schools and universities will purchase Acrobat Reader Professional to compile Reader compatible PDFs with commentary features switched on, from Word documents and some open source word processors. Teachers and academics can use the modified Reader or Acrobat Professional or similar products for marking and feedback to students. Students can use the standard Reader to make further comments thereby creating a double feedback loop.

Assessment Marking Using the ReMarksPDF Markup Editor

Figure 3A:
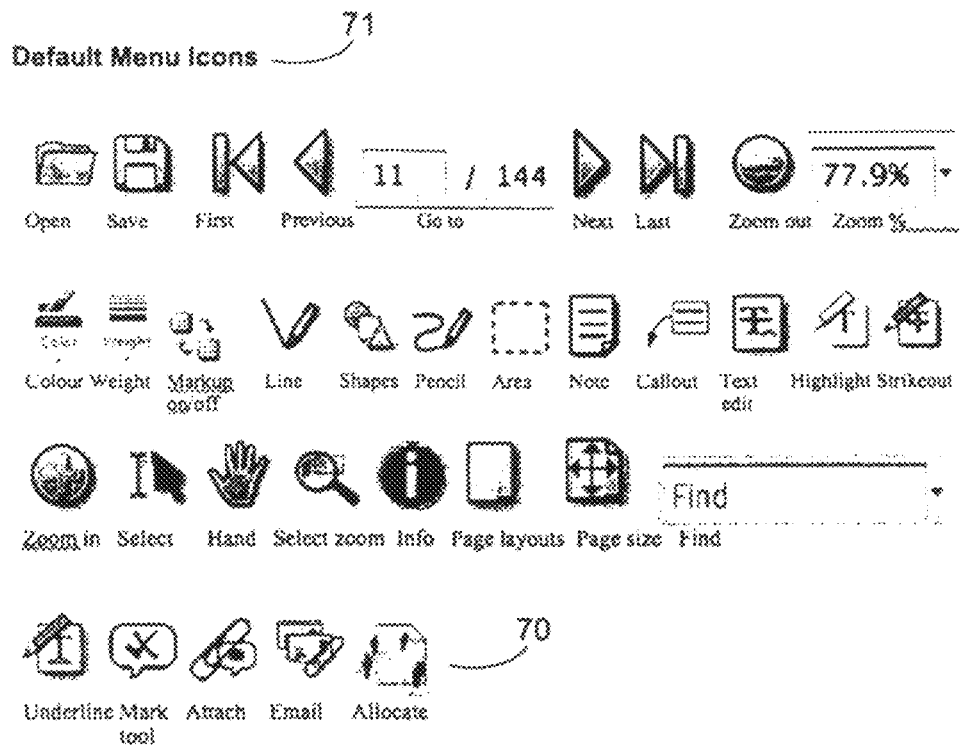
FIG. 3(a) is a screenshot of the default menu icons in the markup editor.

In another example, a PDF markup editor can be built known as ReMarksPDF. The ReMarksPDF interface includes the following features: Default menu icons 71 see FIG. 3(a); tab menu icons 72 see FIG. 3(b). Other variations of the interface include: Vertical split screen view of a single document; Vertical split screen view of two different documents; Horizontal split screen view of a single document; and horizontal split screen view of two different documents.

The ReMarksPDF markup editor incorporates the grading tool and marking features described in the previous section with reference to Microsoft Word and Open Office.

Annotations include drawings, text, media and grading tools found in both the default menu and tab menu; See FIG. 3(a). Drawing tools include the line tool, pencil tool, polygon line tool, shapes tool, and highlight area tool. Text tools include the note tool, callout tool, text edit tool, highlight tool, strike-through tool, and underline tool. Media tools include the sound tab menu and the stamp tab menu. Grading tools include the mark tool, text comment sheet tab menu, report tab menu, attach file tool, email, and allocate tool. In the case of all annotations, marks and comments can be linked to the annotation markup.

Figure 3B:
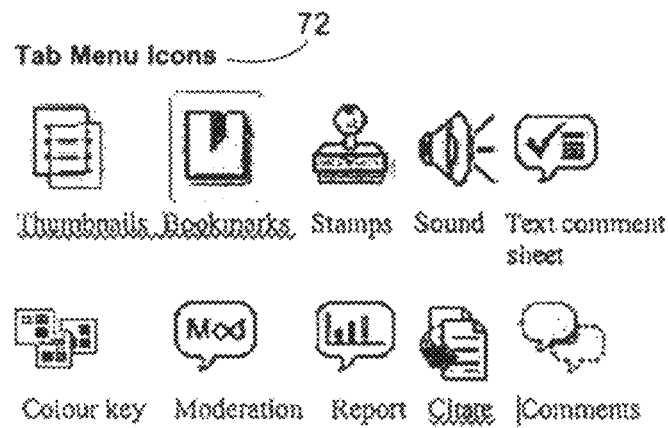
FIG. 3(b) is a screenshot of the tab menu icons in the markup editor.

The Navigation/tools pane has ten tab menus see FIG. 3(b) including: Thumbnails, Bookmarks, Stamps, Sound, Text comment sheet, Colour key, Moderate, Reports, Citate, and Comments.

The Thumbnails menu presents a list of thumbnail icons inserted on pages in the student document. Clicking on a thumbnail opens that page of the student document in the Document pane.

The Bookmarks menu lists user-defined links to sections or parts of the student document. Bookmark options include add, delete or rename a bookmark.

The Stamps tab menu enables stamps to be searched, located in a stamps library, and inserted as an annotation in a student document. Users can define and create stamp libraries, add stamps to an existing library, create custom stamps and change the default stamp library. Stamps can include images, animated images, images that display data capable of being updated automatically, such as date, time, and user name.

The Sound tab menu enables the creation of auto-sounds and sound comment sheets. Clicking on an auto-sound enables that sound to be inserted as an annotation in the student document. Users can define and create sound comment sheets for particular items of assessment, add sounds to a library, create a new sound library, create a custom sound and change the default sound library. A sound comment sheet (auto-sound) is the sound equivalent to a text comment sheet (auto-text). A user can create re-useable sound comments that can be imported and exported to other markers. Options for the sound tab menu include Record/add sound comment, create sound comment sheet and manage sound comment sheet. Create sound comment enables a unique sound comment sheet, consisting of one or more sound recordings, to be created for each assessment. Text labels are created to identify each sound comment. Manage sound comment sheet enables a sound comment sheet to be set as active, edited, imported or exported to other markers.

The Text comment sheet tab menu enables the creation of auto-text and text comment sheets. Clicking on the auto-text enables it to be inserted as an annotation in the student document. Options for the text comment sheet tab menu include create text comment sheet and manage text comment sheet. Create Text comment sheet enables a unique text comment sheet (auto-text) to be created for each assessment. Manage text comment sheet enables a text comment sheet to be set as active, as a default, edited, imported or exported. A text comment sheet (auto-text) is the text equivalent to a sound comment sheet (auto-sound). A user can create re-useable text comments that can be imported and exported to other markers.

The Colour key tab enables meanings to be assigned to user selected colours. Clicking on a colour in the Colour key tab menu changes the drawing tools, text tools (Highlight, strike-through and underline tools) to that colour. Options for the Colour key tab menu include create colour key, manage colour key, default colour key, and insert colour key. Create colour key enables a unique colour key to be created for each assessment. Manage colour key enables a colour key to be set as active, as a default, edited, imported or exported. A default colour key can also be set.

The Moderate tab menu is described in Assessment Moderation below.

The Report tab menu is described in Reporting below.

The Citate tab menu is described in Plagiarism Database and Reporting below.

The Comments tab menu lists all annotations in the student document. Clicking on an annotation changes the view in the Document pane to show the page where the annotation appears in the student document.

Assessment Moderation

Marks are added using the mark/comment tool which opens the panel as shown in FIG. 4(e). A mark is added to the script in box 120, the criteria for the mark is selected from a drop down box 122, and a comment may be added at 124. The total marks awarded to a particular student are indicated in the panel shown at FIG. 4(f).

The "moderation" tool can be used to review student assessments and moderate feedback as required. Alternatively moderation can occur using the Moderate tab menu.

Figure 6A:
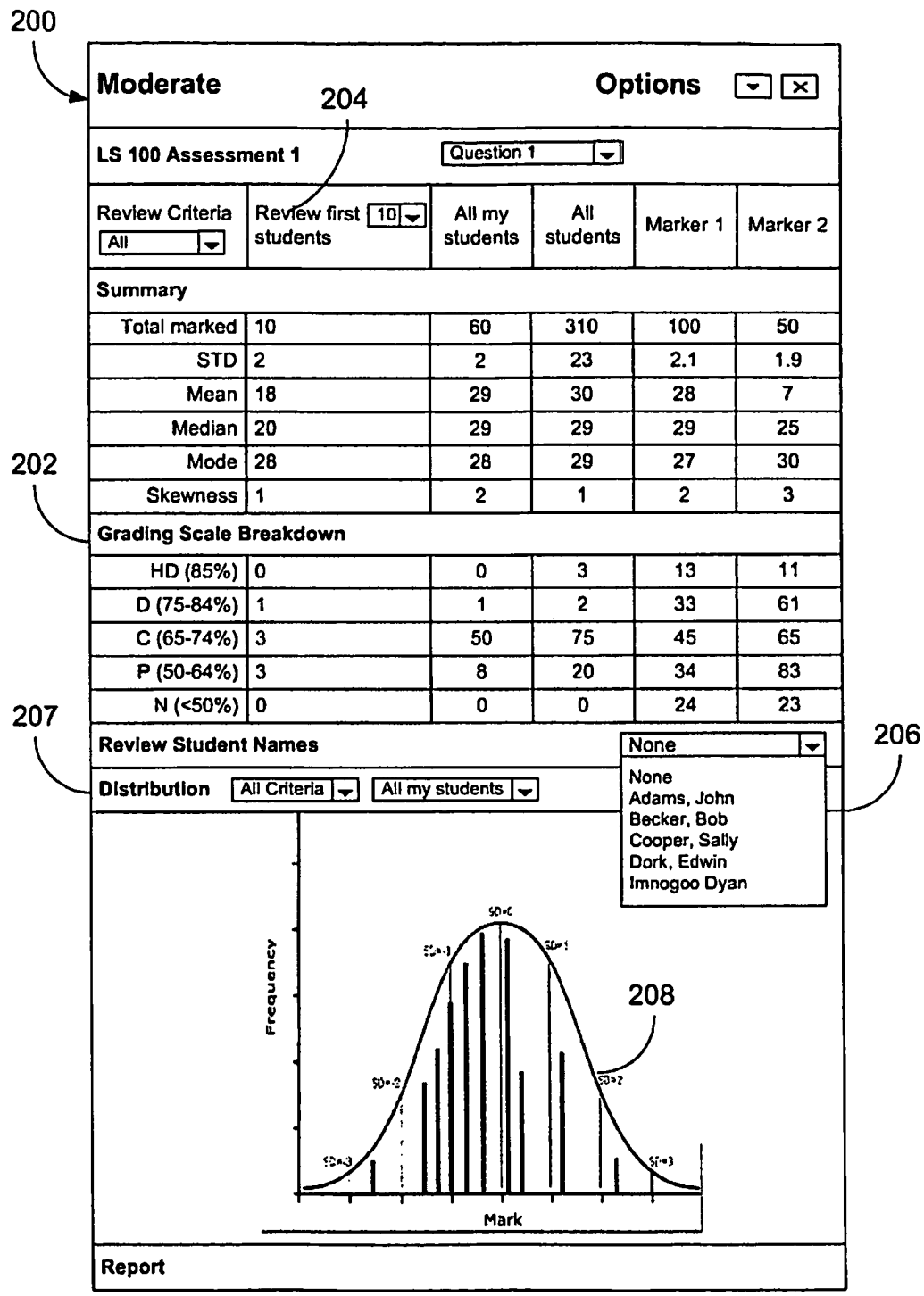
FIG. 6(a) is a close up view of the moderate tab menu.
Figures 6B, 6C:
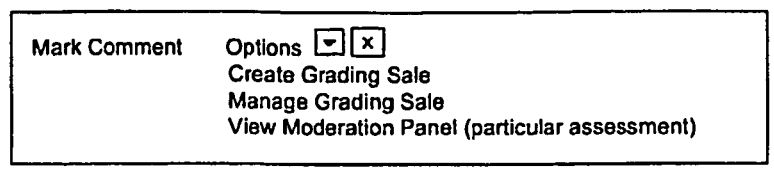
FIG. 6(b) is the options available for the moderate tab menu.
FIG. 6(c) is the interface for creating a grading scale.

Clicking the Moderate tab menu reveals the following options shown in FIG. 6(b):

Create Grading Scale

Manage Grading Scale

Assessment Moderation Panel, such as for a specific unit.

In the example shown in FIG. 6(a), LS100 Assessment 1 has already been set up using the Create Grading Scale shown in FIG. 6(c). As each new assessment item is added, the top of the drop down list reflects this. Users can change the order of the list using the down and up arrows shown in FIG. 6(d). Assessment Moderation Panels can be deleted from the Moderation drop down list by clicking the subtract icon in the Manage Grading Scale; see FIG. 6(d). Grading scales can be created using the interface shown in FIG. 6(c). The grading scale is based on the percentage of total marks available for the item of assessment.

Selecting the Moderate tab menu or Moderate panel option, "Manage grading scale", enables the selection of the active grading scale; see FIG. 6(d). Grading scales can be imported and exported. Existing grading scales can be edited—see FIG. 6(e) and set as a default.

The Moderate tab menu or Moderation panel shows statistics concerning the marks awarded for a particular assessment. In this example shown in FIG. 6(a) the LS100 Assessment 1 has been setup by defining the % marks range for each grade in the grading scale.

The Moderate tab Menu or Moderation panel 200 includes a breakdown of all student marks according to the created grading scale as well as all the students for the particular marker as well as all the students of all markers, marking the same assessment submission. The Review student options 204 enables the user to review a chosen number of students in the order in which they were marked. The review may be by criteria if Criteria were used in the marking process, or by grades in the grading scale, if a grading scale were used in the marking process, or by standard deviation, measures of central tendency, or by points or columns on the displayed standard normal distribution or histogram.

Once a group of students is selected, the names/student numbers of these students will appear in the Review student names dropdown box 206.

A student name selected from the "Review student names" dropdown box 206 will open the marked XML or PDF document for that student. The document can then be moderated and saved. The Moderate Tab Menu or Moderation panel 200 and ReMarksPDF database will then update to reflect the changes.

The grading data is stored on a local computer during marking and moderation. Periodically or when the marker checks in, data is sent to update the central ReMarksPDF database or content management system via an intranet or the Internet.

In the example given in FIG. 6(a) "All criteria and All my students" have been selected 207, which is reflected in the histogram.

The Moderate tab menu or Moderation panel includes a histogram 208 with a standard normal distribution overlay. Selecting a histogram bar will select the students in that bar, whose names will appear in the Review Student name drop-down box. Marks may be moderated by moving the bars of the histogram. Clicking on a student name opens the student's assessment document.

The "All students" column can expand into further columns showing columns and data for individual markers. Selecting any of the columns from 'Review first n students' through 'Marker n' will display a histogram for that selection.

The Moderate tab menu or Moderation panel also enables one or more marker histograms and associated distributions to be overlaid on top of each other. Whole histograms (or columns within histograms) are capable of being moved with a corresponding change in marks and potentially grades displayed in the Summary and Grading Scale breakdown of the Moderate tab menu or Moderation panel as well as in individual student mark tally. It is possible to revert back to earlier steps removing the impact of the moderation.

Plagiarism Detection and Reporting

Referring to FIG. 7, the Plagiarism or Citate tab menu 300 detects data-matches and potential plagiarism, poor citation and copyright infringements. The tool 300 has various options:

Sensitivity, which indicates the number of words in a phrase sought to be matched.

Ignore quotes

Ignore images

Display or hide data-matches.

Generate data matching index

Generate Plagiarism Allegation Report

View list of data-matched indices above [x]%

View the list of top [n] data matches

Search capabilities, such as the ReMarks database and the Internet

Citation classification, such as Create, manage, edit, set default

Data-matching indices histogram, such as Alphabetic sorting, dataset selection

The tool is based on a data-matching system whereby both the Internet and selected databases can be searched. An example database would be all the student submissions for the assessment item being graded and previous student submissions stored in the ReMarks database. This will detect whether students are copying off one another. The Internet can also be searched.

The Citate menu tab includes a histogram based on a user selected data-set. Options for the data-set include All my students (all the user's students) and students of other markers. Student names can be sorted alphabetically, in reverse alphabetic order, or in unique identifier order or reverse order. Selecting a histogram bar will select the students in that bar, whose names will appear in the "Student name/Number (Matching index) drop-down box. Clicking on a Student name will open a screen for that student.

Data-matches are highlighted in a unique colour within the same coloured box and a comment automatically inserted into the XML or PDF document. Each matched source has a unique number and colour code. The comment will include a URL link to the matched URL. Double-clicking the URL will open the split screen view. The text-matching index indicates the extent to which other people's work is reflected in the student's assessment. This index is a broad measure of originality of thought represented in the assessment submission.

This tool is relevant for several purposes, including assisting in judging the academic merit of the work, identifying copyright infringements, assisting in identification of potential plagiarism and as the basis for a stylometry analysis. The data-matches, with the ReMarks Database or Internet are ranked in order of % match. Matches with the ReMarks database are also ranked as they may indicate student misconduct. The highest percentage matches are displayed for both the Internet and the ReMarks database, by default or according to user settings.

Each data-matched text segment will have a drop-down classification checkbox in the student's assessment, enabling academics to check if in their view plagiarism is evident. The options if selected will enable the automatic generation of a Plagiarism Allegation Report.

Each data-matched text segment in the original source document will have a drop-down listing of the user defined number of closest Internet matches and the user defined number of closest ReMarks database matches. Alternatively, the drop-down listing can be generated based on matches with a percentage above a specified data-matching index. Clicking on any of these matches will display the matched document in the right hand screen. The corresponding shading and boxed matches will appear in the left-hand screen.

A data-matching index indicates the percentage of the total word count matched to sources external to the individual student's assessment submission. The higher the percentage, the less originality appears evident in the assessment submission.

For each citation data-matched there are user defined classification options. The default options are: valid citation, unattributed quotation, sham paraphrasing, metaphor plagiarism, idea plagiarism and reasoning style or organizational plagiarism. Users can amend the classification options to have more or less or differently worded options. These user-defined classifications when linked to a data-match, base the creation of a Plagiarism Allegation Report.

The data-matching report lists all matched sources one after another with unique numbers and colour codes. The percentage match and source is also listed. For example, a data-matching report may be as follows:

80% match—http://www.rubric.com.au
2% match—http://www.deaddog.com.au

The Plagiarism Allegation Report documents allegations of plagiarism based on teacher assessment of matched data. The assessment is based on the classification options discussed above.

Reporting

Referring to process 65 in FIG. 1, the Reports Tool enables the insertion of summary graphs and tables of student performance into a submission paper, for example as part of a cover page.

Reports can be dragged and dropped into the document at any point and automatically populate from the ReMarks database. Information may also be extracted from external databases, such as business intelligence data system or census data, for report generation. For example, postcode of students may be extracted based on the address of the students from an external database, allowing generation of reports highlighting that marks for people from non-metropolitan postcodes are different from those in metro areas.

There are four variations on the types of available reports:
No marking criteria, no moderation, returned immediately to student. This is the default position.
Marking criteria, no moderation, returned immediately to the student. This is the menu available when marking criteria have been specified.
No marking criteria, moderated, returned when all students have been marked. This is the default position if there is moderation.
Marking criteria, moderation, returned when all students have been marked. This is the menu available when marking criteria and moderation have been specified. The marked assessment can be returned to the student via email, SMS, student account or any other electronic communications means.

In addition, the Reports Tool also incorporates the colour key table if active and marking tally awarded, broken down by criteria if relevant. The report options for these four variations include, but are not limited to the following variations:

| Variation | Report options |
| --- | --- |
| 1 | Score line chart with no average |
| 2 | Score line charts with no average for all criteria and/or for the total of all criteria. |
|   | Spider graph |
| 3 | Score line chart with average |
|   | Histogram |
| 4 | Score line chart with average for all criteria and/or for the total of all criteria. |
|   | Histogram for all criteria and/or the total of all criteria |
|   | Spider graph |
|   | Column chart |
| 5 | Plagiarism report |
|   | Colour Key |
|   | Marks Tally |

Figure 8:
FIG. 8 is an example of a cover page inserted into a marked submission.

An example of the report generated as a cover page is shown in FIG. 8. There are three graphs on the page: a score line chart 402 showing all criteria, a score line chart 404 showing all criteria with average and a spider graph 406 with average. An audio comment 408 is also inserted into the document. A colour key table 410 and mark tally 412 are also inserted.

Return of Marked Up Assessment to Students

Referring to FIG. 1 again, a marked assessment is then converted to a suitable format such as PDF to embed and secure all markups by the marker; 50. The inserted reports and mark tally can be regenerated and updated as part of the conversion process. The marked-up assessment is then returned to students via email attachment or made available on a ReMarks website or student portal or by means of an electronic communications system or network. There can be immediate return with no moderation or a general release after moderation. When the assessment is ready to be viewed, an email or text message or other form of electronic communication will be sent to the associated student.

In relation to the output provided to students:
Individual descriptors can be available immediately without moderation. A graphical output can be embedded in the coversheet at the start of the marked XML document and PDF.
Group descriptors are only available after moderation when averages can be finally calculated. This would involve a bulk release of marked materials with either individual descriptors and or group descriptors inserted in the coversheet at the beginning of the marked XML document and PDF.

Marker identity—Markers may be identifiable—name and contact details. The amount of time a Marker spends marking an assessment item also needs to be timed as should a measure of the amount of commentary they have provided. These are useful measures of value for money and form the basis of management reports which form part of the system.

Feedback from Students

Referring to FIG. 1 again, the feedback loop is complete as students can use any suitable mark-up tools to mark-up further comments on the marked assessment and send these back to unit coordinators for further comment. In the case of moderation, all marked up documents will need to be regenerated to embed changes such as update reports before they are returned to students.

Stand Alone Solution

The document markup editor/reader of this invention could stand alone and not be linked to a database. In this context:

(i) the moderation panel would not be functional; and
(ii) the reporting option variations would be limited to variations 1 and 2 described above.

Although an embodiment of the invention has been illustrated in the context of grading student scripts, it will be appreciated that the invention extends beyond its use in education and can be used in other applications where submissions or documents need to be assessed, marked up or annotated. For example, the invention can be used to assess, mark up or edit job applications, research grant applications, project proposals and movie scripts.

It will be appreciated by persons skilled in the art that numerous variations and/or modifications may be made to the invention as shown in the specific embodiments without departing from the scope of the invention as broadly described. The present embodiments are, therefore, to be considered in all respects as illustrative and not restrictive.

The invention claimed is:

1. A computer executing a document markup tool for annotating existing authored documents, operable by a user at a user interface of the computer to:
recognize the members of a set of existing documents;
open one of the existing documents in a set and display its contents to a user together with a toolbar; and,
select locations in the document and, using the toolbar, add commentary and scores to the document;
wherein the markup tool is automatically operable to:
total the scores made in a document;
display the scores in a graphical report in the document;
display a moderation panel for ensuring marking consistency across multiple markers, wherein the moderation panel:
(a) enables graphical and statistical comparisons of the scores made in a subset of marked documents, to the scores added to all the marked documents of the set;
(b) allows changes to scores in the subset of marked documents using the displayed moderation panel, and reflects the changes made in the displayed moderation panel by updating the graphical and statistical comparisons;
(c) enables graphical and statistical comparisons of the scores made by one marker in the subset of marked documents, to the scores made by one or more other markers in the subset of marked documents or all the marked documents of the set; and
(d) allows changes to the scores made by one of the markers in the subset of marked documents using the displayed moderation panel, and reflects the changes made in the displayed moderation panel by updating the graphical and statistical comparisons.

2. A computer executing a document markup tool according to claim 1, wherein the markup tool is further operable to display an allocation panel which enables allocation of existing documents, in part or in whole, among the markers.

3. A computer executing a document markup tool according to claim 1, wherein the markup tool takes the form of one of the following:
a plug-in for, or amended coding within, a document handling application;
additional features added to a document handling application;
a new document handling application itself; and
a web-based or SMS-based application that is supported by a communications network.

4. A computer executing a document markup tool according to claim 1, wherein the tool is set up to automatically recognize all documents submitted for a particular assessment as a set.

5. A computer executing a document markup tool according to claim 1, wherein scores are displayed, broken down by assessment or marking criteria.

6. A computer executing a document markup tool according to claim 1, wherein the tool further includes functionality to embed within a document one or more of:
video and audio commentary, including auto-video and auto-audio commentary;
comments, auto-text comment sheets and electronic sticky notes;
underlining, strikeout, colour-coded highlighted text and background;
Stamps, including images, emoticons and animations;
drag and drop self-populating graphs and reports;
scores tally;
colour keys indicating meanings attached to colours;
auto-colour coding of data matches; and
attachments such as electronic files, video or audio commentary.

7. A computer executing a document markup tool according to claim 6, further comprising a stamp library from which stamps are located and selected for insertion into a document where they are displayed.

8. A computer executing a document markup tool according to claim 6, further comprising a sound library in which audio comments are recorded and retrieved for insertion into documents where they are played.

9. A computer executing a document markup tool according to claim 6, further comprising a video/animation library in which video or animation are recorded and retrieved for insertion into documents where they are played.

10. A computer executing a document markup tool according to claim 1, wherein the moderation panel has an associated store for the scores and documents, and operates to automatically update all scores and documents as grading or moderation occurs.

11. A computer executing a document markup tool according to claim 1, wherein the moderation panel enables identification and opening of documents based on one or more of the following:
marking criteria;
number of marked documents;
markers;
grading scale breakdown;
document submitter's demographic characteristics, such as age, gender, ethnicity and location;
document submitter's status, such as full-time, part-time, internal or external and domestic or international;
standard deviations above or below the mean; and
mean, median and mode of the scores.

12. A computer executing a document markup tool according to claim 1, wherein the moderation panel displays marked documents by one or more markers in a predetermined order.

13. A computer executing a document markup tool according to claim 12, wherein the moderation panel also displays other information associated with the document or document submitter.

14. A computer executing a document markup tool according to claim 1, wherein the moderation panel enables scores to be displayed on a graph of their standard normal distribution, or on bars of a histogram.

15. A computer executing a document markup tool according to claim 14, wherein scores associated with a bar on the histogram are changed by dragging the bar to a new location on the histogram, and the changed scores are then automatically updated in the moderation panel, one or more documents associated with the bar in an associated store, and scores tally in each of the one or more documents.

16. A computer executing a document markup tool according to claim 10, wherein in the event of moderation, the moderation panel allows identification and access to an individual document, and enables changes to scores in the document; in this case the changed scores are automatically reflected in the moderation panel, scores tally in the document, and the associated store.

17. A computer executing a document markup tool according to claim 1, wherein the markup tool also displays a data-matching panel which calculates an index of a match of the contents of an existing document with other material in order to detect potential plagiarism or copyright infringement.

18. A computer executing a document markup tool according to claim 1, further comprising a reporting tool enabling the visual display of individual results and comparative results.

19. A computer executing a document markup tool according to claim 1, wherein the moderation panel allows selection of the subset of marked documents by filtering all the marked documents of the set according to one or more of:
   marking criteria;
   questions in the marked documents;
   identify of the markers; and
   number of marked documents in the subset.

20. A computer executing a document markup tool according to claim 19, wherein the moderation panel further:
   enables comparisons of the scores made in the subset of marked documents, to the scores added to all the marked documents of the set according to a grading scale of the scores; and
   if there are changes to the scores, changes distribution of the scores on the grading scale.

* * * * *